Patented Jan. 24, 1933

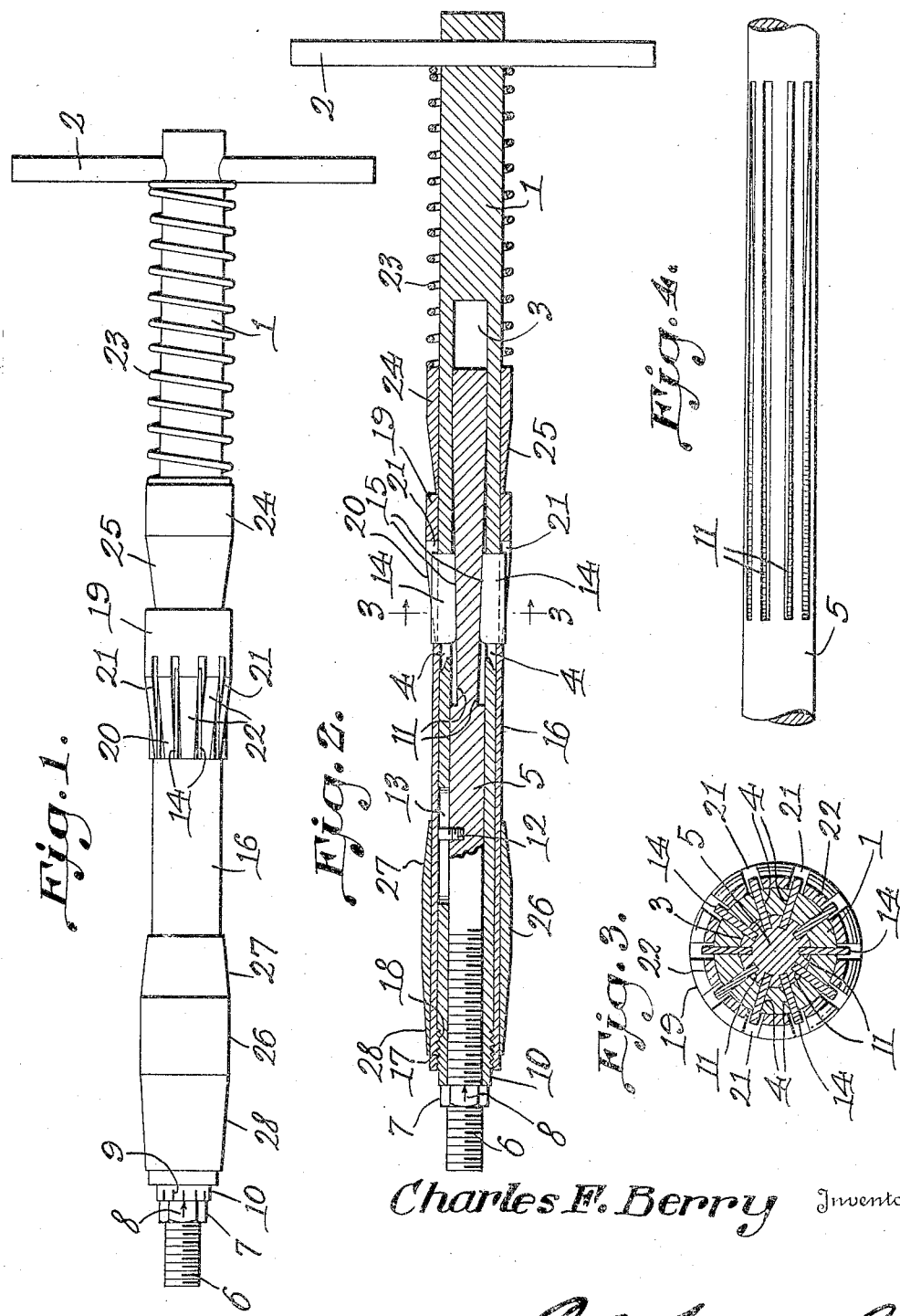

1,894,937

UNITED STATES PATENT OFFICE

CHARLES F. BERRY, OF COLUMBUS, KANSAS, ASSIGNOR TO BERRY BROS. TOOL MFG. CO., OF COLUMBUS, KANSAS

REAMER

Application filed January 20, 1931. Serial No. 510,005.

This invention relates to a reamer for use by machinists and others, one of the objects being to provide a tool of this character utilizing cutting blades which are simultaneously adjustable radially to produce a bore of any desired diameter, the adjustment being effected readily and, if desired, very minutely.

A further object is to provide a reamer utilizing a pilot by means of which the tool can be accurately centered in the work, the construction of the pilot being such that the same will engage the work at the entrance to the opening in which the reamer is to be used.

A still further object is to provide a yieldingly pressed pilot movable longitudinally of the tool and adapted to be kept at all times in proper position on the work during the reaming operation.

Another object is to provide a supplemental pilot movably mounted on the reamer for properly engaging and centering the work at a point remote from the reaming blades so that the work will be held against tilting relative to the reamer.

A still further object is to so mount the blades of the reamer that they will be held rigidly while in use so as to insure an accurate cut, said blades being readily shiftable at any time to vary the size of the cut.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing, the preferred form of the invention has been shown.

In said drawing:

Figure 1 is a plan view of the reamer.

Figure 2 is a central longitudinal section therethrough, a portion of the core being shown in elevation.

Figure 3 is an enlarged section on line 3—3, Figure 2.

Figure 4 is an enlarged elevation of the grooved portion of the core.

Referring to the figures by characters of reference, 1 designates an elongated cylindrical body one end of which can be provided with a pin 2 extending diametrically therethrough to constitute a handle by means of which the tool can be rotated or held. A bore 3 is extended into the body from the other end thereof and the body is provided at an intermediate point with longitudinal slots 4 radiating from the longitudinal axis of the body and preferably regularly spaced annularly.

Slidable longitudinally within the bore 3 is a core 5 one end of which is screw-threaded as shown at 6 and projecting beyond the body, there being a nut 7 on this threaded portion which, as shown in Figure 1, can be provided with an index or pointer 8 adapted to cooperate with an annular series of graduations 9 formed on the adjacent end of the body 1 which, as indicated at 10, is of reduced diameter. The graduations 9 can indicate minute fractions of a unit of measure such, for example, as 1,000ths of an inch or 10,000ths of an inch.

An intermediate portion of the core 5 is formed with longitudinal grooves 11 which are regularly spaced annularly and gradually increased in depth toward one end, the bottom of each groove terminating at its other end at the surface of the core. These grooves 11 are of the same width as the slots 4 and register with them. For the purpose of holding the core and body against relative rotation a dowel 12 is seated in the core and projects into a longitudinal slot 13 formed in the body.

Arranged within the slots 4 and the grooves 11 are blades 14 which frictionally engage the side walls of the slots and grooves and have their inner longitudinal edges 15 so pitched as to bear throughout their lengths upon the inclined inner walls of grooves 11 while the opposite or outer longitudinal edges are maintained parallel. Thus it will be seen that when the core 5 is adjusted longitudinally in one direction the blades 14 will be simultaneously shifted radially although their outer or cutting edges will be maintained parallel. By shifting the core in the opposite direction it becomes possible to force the blades back into the grooves to a predetermined diameter.

For the purpose of holding the blades tightly against longitudinal displacement, a sleeve 16 is mounted on the body 1 and bears at one end against all of the blades while its other end is interiorly screw-threaded as at 17 and engages threads 18 on the reduced end portion of body 1. Obviously by rotating this sleeve in one direction it will force the blades 14 against one end of the slots 4 and clamp the blades 20 in place. This is done following the radial adjustment of the blades heretofore explained.

For the purpose of holding the tool properly centered in the work, opposed pilots are provided. One of these pilots includes a collar 19 tapered toward one end as shown at 20. This tapered portion of the collar is formed with radially disposed longitudinal slots 21 which divide said portion into annularly spaced fingers 22. These fingers extend between the blades 14 and are designed to wedge into that end of the work where the reamer is to cut. In order that this pilot may be held pressed against the work during the operation of the reamer, a coiled spring 23 is mounted on the body 1 and bears at one end against the pin 2 while its other end thrusts against a tubular follower 24. This follower is slidable on the body and bears at one end against the collar 19, said end of the follower being tapered as shown at 25.

The other pilot includes a sleeve 26 which is slidable on sleeve 16 and has its ends differently tapered as shown at 27 and 28. This pilot is detachable and reversable and is adapted to wedge into that end of the work remote from the pilot 19—22.

In practice the nut 7 is rotated on the threaded portion of the core 5 until the cooperating indicator 8 and graduations 9 indicate that the blades 14 have been adjusted radially to make a cut of the required diameter. The tool, with pilot 26 removed therefrom, is then inserted into the work after which pilot 26 is replaced and wedged into the work. The work will thus be held between the two pilots and when the work and tool are rotated relative to each other, the blades will cut to the desired depth and produce a cylindrical counterbore of the desired diameter.

By providing the dowel 12 the blades are relieved from lateral strains and danger of distortion through possible rotation of the core relative to the body.

Although the blades have been shown and described as adapted for cutting a cylindrical counterbore, it is to be understood that blades suitably tapered could be used for producing tapered counterbores.

What is claimed is:

A reamer including a body having a bore extending into one end and a guide slot, a core slidable in the body and adjustable longitudinally thereof, there being an annular series of longitudinal grooves in the core, said grooves and slots registering and each of the grooves increasing in depth toward one end, a pin on the core slidable in the guide slot, radial blades seated in the series of slots and grooves and bearing inwardly against the core, a sleeve adjustably threaded at one end on the body and adjustable for clamping the blades against one end of the slots, said sleeve housing the guide slot and pin, a member slidably mounted on the body and including a collar and an annular series of fingers extending from the collar and between the blades, said fingers being tapered, and extending throughout the length of the blades, a follower slidable on the body and bearing against the fingered pilot, and a spring on the body thrusting constantly through the follower against the fingered member, thereby to hold said member between the blades and against the sleeve.

In testimony that I claim the foregoing as my own, I have hereto affixed my signature.

CHARLES F. BERRY.